(12) United States Patent
Tsai et al.

(10) Patent No.: US 10,146,753 B2
(45) Date of Patent: Dec. 4, 2018

(54) VISUAL REGRESSION TESTING TOOL

(71) Applicant: INTUIT INC., Mountain View, CA (US)

(72) Inventors: Carol Chiam-Mei Tsai, Mountain View, CA (US); Nirja Shah, Mountain View, CA (US); Muzaffar H. Malik, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 155 days.

(21) Appl. No.: 15/218,861

(22) Filed: Jul. 25, 2016

(65) Prior Publication Data

US 2018/0025503 A1    Jan. 25, 2018

(51) Int. Cl.
*G06F 17/22* (2006.01)
*G06T 1/00* (2006.01)
*G06T 7/40* (2017.01)
*G06T 11/60* (2006.01)
*G06F 11/36* (2006.01)
*G06K 9/62* (2006.01)

(52) U.S. Cl.
CPC ........ *G06F 17/2247* (2013.01); *G06F 11/368* (2013.01); *G06K 9/6202* (2013.01); *G06T 1/0007* (2013.01); *G06T 7/408* (2013.01); *G06T 11/60* (2013.01); *G06T 2207/10004* (2013.01)

(58) Field of Classification Search
CPC ....... G06T 7/408; G06T 1/0007; G06T 11/60; G06T 2207/10004; G06F 17/2247
USPC .......................................................... 382/100
See application file for complete search history.

(56) References Cited

U.S. PATENT DOCUMENTS 9,262,396 B1 * 2/2016 Rodriguez Valadez ..................... G06F 11/3684
2013/0004087 A1 * 1/2013 Kumar ................ G06K 9/6202
382/218

FOREIGN PATENT DOCUMENTS

WO    2016/065216 A2    4/2016
WO    WO 2016065216 A2 *  4/2016 .......... G06F 11/3672

OTHER PUBLICATIONS

International Search Report and Written Opinion dated Jul. 11, 2017 for Application No. PCT/US2017/030668.

* cited by examiner

*Primary Examiner* — Amandeep Saini
(74) *Attorney, Agent, or Firm* — Patterson + Sheridan, LLP

(57) ABSTRACT

Techniques are disclosed for performing visual regression testing for a software application. In one embodiment, a regression testing tool identifies a first collection of web pages from a first version of the application, and captures an image of each identified web page. The regression testing tool identifies, for one or more of the identified web pages, a corresponding web page in a second collection of web pages from a second version of the application, and captures an image of the corresponding web pages. The regression testing tool identifies differences in pixel values for images in the first collection and images in the second collection to determine differences between the image of at least one web page in the first collection and the image of the corresponding web page. The regression testing tool generates an image providing a visualization of the one or more differences.

20 Claims, 7 Drawing Sheets

Invoice

Choose a customer [ ▲▼ ]   Email [      ]   Online Payment
                             ☐ Send later    ☐ Credit card
                                             ☐ Bank transfer

"PAYMENT STATUS"
SHOWING UP ON
INVOICE PAGE INSTEAD
OF BALANCE DUE

BALANCE DUE
PAYMENTS
$0.00  — 306

Billing address [      ]   Terms [ ◀▶ ]   Invoice date [      ]   Due date [      ]

| PRODUCT/SERVICE | DESCRIPTION | QTY | RATE | AMOUNT |
|---|---|---|---|---|
| 1 | | | | |
| 2 | | | | |

Total $0.00

Balance due $0.00

FIG. 3B

Sales Transactions

⚙ FamilyRules  ❓ Help

🔍  +  ↻

Add notes

| IMPORT TRANSACTIONS DROPDOWN MISSING ON SALES TRANSACTIONS PAGE |
|---|

Import Transaction ▼ — 308

New Transaction ▼

| $0 | $0 | $0 | $0 | $0 |
|---|---|---|---|---|
| 0 ESTIMATE | 0 UNBILLED ACTIVITY | 0 OPEN INVOICE | 0 OVERDUE | 0 PAID LAST 30 DAYS |

🖶 ↗ ⚙

| Batch actions ▼ | | | | | | |
|---|---|---|---|---|---|---|
| ☐ DATE | TYPE | NO. | DATE DUE | BALANCE | TOTAL | STATUS | ACTION |

There are no transactions matching the criteria.

FIG. 3C

VISUAL REGRESSION TESTING TOOL

FIELD

The present disclosure generally relates to techniques for testing computer software, and more specifically, to techniques for visual regression testing of computer software.

BACKGROUND

Complex software applications and services are frequently made available to users over computer networks, such as the Internet. For example, software applications used to prepare and file income tax returns are frequently offered as an online service. In addition to generating tax return documents, these online services typically guide a user through a collection of complex interactive workflows in order to prepare a complete, valid income tax return. Other online services allow users to access software applications used to prepare a variety of other legal and formal documents. For example, online services are available which direct a user through a guided interaction to generate estate planning documents, corporate entity documents, legal filings, etc. Still other complex software applications accessed as an online service include financial service applications, which allow users to complete mortgage applications or apply for home, life, or automobile insurance.

In addition to these primarily transactional online services, a variety of complex software tools offer users access to both online services and local client applications, e.g., financial accounting software, video editing or media composition software, software development tools, etc. Such applications may allow users to access application features and user data stored online, regardless of whether the application is installed locally by an end user or accessed as an online service. Once customer data is stored by a service provider, end users can access their data using a variety of clients, including a web browser used to access a software application as a series of web pages, dedicated "thin" client applications, and so-called "apps" accessed using a mobile telephone or computing tablet.

Generally, software developers perform regression testing before releasing a new version of a software application. The purpose of regression testing is to ensure that changes to software has not adversely affected existing functionality of the software. Such changes, for example, can include software enhancements, patches, configuration changes, etc. Common methods of regression testing include rerunning previously completed tests and checking whether program behavior has changed and whether previously fixed faults have reemerged. For popular applications and services, regression testing plays an integral part of the software development process.

SUMMARY

One embodiment presented herein includes a method for performing visual regression testing of an application. The method generally includes identifying a first collection of web pages associated with a first version of the application by traversing web links from an initial web page of the first collection, and capturing an image of each web page identified by traversing the web links from the initial web page of the first collection. The method also includes identifying, for one or more of the web pages in the first collection, a corresponding web page in a second collection of web pages associated with a second version of the application, and capturing an image of the corresponding web pages in the second collection. The method further includes identifying differences in pixel values for images in the first collection and pixel values for images in the second collection to determine one or more differences between the image of at least one web page in the first collection and the image of the corresponding web page in the second collection, and generating an image providing a visualization of the one or more differences.

In one embodiment, the image providing the visualization of the one or more differences is generated upon determining that an amount of differences in pixel values for the image of the at least one web page in the first collection and the image of the corresponding web page in the second collection exceeds a defined threshold value. In one embodiment, the visualization of the one or more differences displays the one or more differences in color, shading or grayscale.

Additional embodiments include a system having a processor and a memory storing one or more application programs configured to perform the methods disclosed herein and a computer-readable storage medium storing instructions, which when executed on a processor perform the methods disclosed herein.

BRIEF DESCRIPTION OF THE DRAWINGS

FIGS. 3A-3C illustrate example images, generated by the visual regression tool, that highlight differences between web pages of a production version of an application and a release version of an application, according to one embodiment.

DETAILED DESCRIPTION

Figure 1:
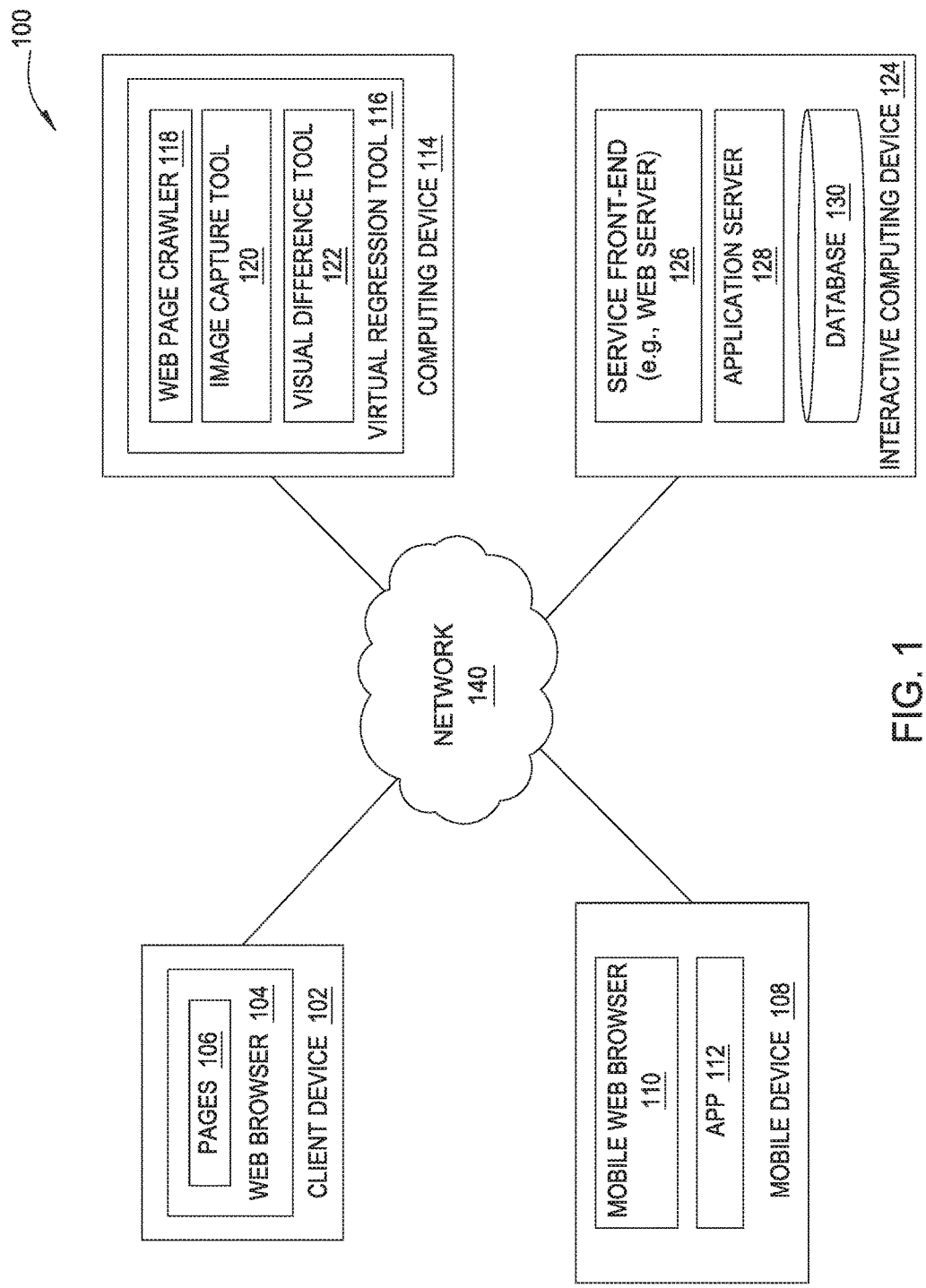
FIG. 1 illustrates an example of a computing environment that includes a visual regression tool for an interactive computing service, according to one embodiment.

Embodiments presented herein provide techniques for implementing visual regression testing of an application. More specifically, embodiments presented herein identify visual differences between web content generated by different versions of an application, e.g., an application currently in production and a release candidate release version of an application. Doing so allows developers to quickly perform regression testing for a release candidate version of an application without writing any tests.

For example, complex software applications often include web pages that allow users to interact with the application. Using an online tax preparation service as a reference example, such an application may provide over a hundred web pages and workflows to assist users in accomplishing a particular task, e.g., such as filing a tax return. In other reference examples, online services may provide workflows that allow users to generate accounting documents (e.g., customer invoices, etc.), complete mortgage applications, generate legal documents, apply for life insurance, and so on. For many of these complex applications, developers are constantly updating or improving application features and services with each new application release. As a result, many of the workflows and user interfaces (UIs) associated with a software have the potential to constantly change with each application release. Such changes pose a challenge for regression testing as quality engineers who are trying to address significant automation backlog gaps are unable to keep up with the pace of change. Moreover, although developers can write test cases to specifically test the UI of an application, such UI automation tests usually only test the presence or absence of pre-defined document object model (DOM) elements, as opposed to testing for visual bugs caused by cascading style sheets (CSS). As a result, identifying the visual bugs that may be present in a new release of an application often relies on a human to manually view and catch visual bugs in every web-page associated with an application. Such manual testing however requires enormous human effort, is slow and significantly error-prone.

Examples presented herein provide improved techniques for implementing regression testing for a software application (e.g., compared to conventional regression techniques) without writing any tests. Particularly, as opposed to manually attempting to identify visual bugs in a candidate release version of an application, the techniques presented herein allow developers to quickly identify visual CSS bugs that may result in UI layouts that are only a few pixels off.

In one example, a regression testing component may receive a base (or reference) version of an application and a target version of the application. Such reference version may be a version of the application currently in production (e.g., the application users currently interact with), a base version of the application, or another version of the application that has undergone testing and verification. The target version of the application may be a reference candidate version of the application being tested and verified. Once received, the regression testing component logs into the reference version of the application, crawls the application for every web page (or link) associated with the application, and captures an image (e.g., screenshot) of every identified web page.

Continuing with the online tax preparation service example of a software application, the regression testing component can start at the introductory web page of the application (e.g., the homepage) and identify each uniform resource locator (URL) on the homepage of the application (e.g., by parsing the hypertext markup language (HTML) markup for the homepage). For each identified URL, the regression testing component navigates to the associated web page, captures an image, and identifies any URLs present on the current page. The regression testing component continues to do so until an image of every web page associated with the reference version of the application is captured. Once completed, the regression testing component performs a similar process for the candidate release version of the application. That is, the regression testing component can start at the homepage of the release version of the application, identify all URLs associated with release version, navigate to each web page associated with the respective URL, and capture an image of the web page content. Thus, by traversing web links from an initial web page of a version of an application, the regression testing component can identify the web pages that are associated with the version.

In one example, the regression testing component compares the images from different versions of the application and generates images that highlight the visual differences between the corresponding images from the different versions. For example, assume the regression testing component captured an image (e.g., screenshot) of a web page (e.g., taxapplication/transaction) from the production version of an online tax preparation service and captured an image of the corresponding web page (e.g., release.taxapplication/transaction) from the release version of the online tax preparation service. In such a case, the regression testing component can compare the corresponding images pixel-by-pixel to determine if there are any differences between the web pages. Such differences, for example, may indicate the presence of one or more visual layout breaks and/or the presence of one or more functional breaks in the release version of the application.

If the regression testing component identifies differences between the two corresponding images, the regression testing component can generate another image that superimposes the two corresponding images and provides a visualization of the differences between the two images. Such visualization, for example, may include showing the differences in a particular highlighting, color, shading, grayscale, or any other manner that distinguishes features that may be different between the two versions of the application. Once generated, a user (e.g., developer, quality engineer, etc.) can inspect the generated image to determine if the highlighted differences are acceptable. In this manner, the techniques presented herein provide an automated regression technique that tests for visual differences in all pages of an application. As a result, developers or quality engineers no longer need to write tests that navigate to each page in the application and search for the expected DOM elements for several different types of browsers and computing devices.

Note, embodiments of the disclosure are described herein using an online tax-preparation service as an example of computer software, software interfaces, etc., that may be tested using the visual regression techniques disclosed herein. One of ordinary skill in the art will recognize that the visual regression techniques herein may be applied to a broad variety of software applications, online or web services, software features, etc.

FIG. 1 illustrates an example of a computing environment 100 that may be used to provide visual regression testing for an application, according to one embodiment. As shown, the computing environment 100 includes client device 102, computing device 114, mobile device 108 and interactive computing service 124, which are each connected to a network 140. The network 140, in general, may be a wide area network (WAN), local area network (LAN), wireless LAN (WLAN), personal area network (PAN), a cellular network, etc. In a particular embodiment, the network 140 is the Internet.

Client device 102 and computing device 114 are included to be representative of a general purpose computing system, such as a desktop or laptop computer hosting applications used to access the interactive computing service 124. For example, client device 102 includes web browser 104 used to access the interactive computing service 124 by rendering web pages 106 received from the interactive computing service 124. Mobile device 108 is included to be representative of a variety of computing devices, such as a mobile telephone or computing tablet. The mobile device 108 may access the interactive computing service 124 over network 140 using a mobile web browser 110 or local application 112 executed on the mobile device 108.

In one embodiment, web browsers 104, 110 and app 112 communicate with the interactive computing service 124. For example, in the case where interactive computing service 124 offers a tax-preparation service, web browsers 104, 110 and application 112 may provide software which guides a user through preparing a tax return as well as provide the user with access to a variety of related features (e.g., help guides and other tax-related content) available from the interactive computing service 124.

As shown, the interactive computing service 124 includes a service front-end 126, an application server 128 and a database 130. In this example, the interactive computing service 124 is generally modeled as a web server (i.e., service front-end 126), an application server 128, and a database 130. Of course, other software architectures or distributed application frameworks could be used. Service front-end 126 and application server 128 are included to be representative of physical computing systems, as well as representative of virtual machine instances deployed to a computing cloud. Service front-end 126 may communicate with application server 128 to respond to requests from applications on client device 102 and mobile device 108.

In one embodiment, the application server 128 may respond to requests from users by generating HTML and related content passed to a user and rendered as a user interface (e.g., forms, text fields, and so on, along with scripts or applets executed by a web browser). In some cases, the application 112 running on mobile device 108 can generate user interface content to present data retrieved from the application server 128. In general, the application server 128 may be implemented using any suitable software programming language, application framework, web service solution stack, virtual application containers, etc., in order to present application features and content to a user.

In some embodiments, the application server 128 may include one or more graphical user interface (GUI) components that interactive computing service 124 can present on client device 102 and mobile device 108 based on whether a user is interacting with a workflow via application server 128, or other content hosted by interactive computing service 124. The GUI components may include, for example, HTML components or code that generates HTML components that can be passed to client device 102 and mobile device 108 and rendered as a user interface. The GUI components may additionally include instructions executable by client systems or mobile devices to display a user interface. The GUI components may additionally include instructions executable by client device 102 and mobile device 108 to display a user interface using language-specific or operating system-specific GUI components (e.g., instructions for displaying Win32 forms or similar components on other operating system platforms, Abstract Window Toolkit or Swing API components on the Java platform, and so on). Generally, instructions capable of rendering a GUI on client device 102 and mobile device 108 may include computer executable code generated from compiling and/or interpreting C (or variants thereof), Java, PHP, Ruby, HTML, javascript, Python, AJAX, VBscript, and other programming or scripting languages used to compose and present a GUI. In an example tax preparation application, application server 128 components may include screens for prompting a user for personal information (e.g., name, address, social security number, marital status, gender), income information (from W-2s, 1099s, K-1s, and so on), various deductions and credits that the user may qualify for, etc.

As shown, computing device 114 includes a visual regression tool 116, which is configured to perform regression testing for applications hosted by the interactive computing service 124. For example, before releasing a new version of an application, a developer can use the visual regression tool 116 to quickly determine if the new version of the application contains any unexpected visual defects (or bugs), as opposed to writing numerous test cases to account for all possible defects across different types of computing devices and browsers.

As shown, the visual regression tool 116 includes a web page crawler 118, image capture tool 120 and a visual difference tool 122. In one embodiment, to test a new version of an application, the visual regression tool 116 may receive a reference version (build) of the application. In one example, the reference version of the application can be a version that is currently being used by users in the production environment (e.g., the application provided to client device 102 and mobile device 108). In another example, the reference version of the application can be a version of the application that has already undergone regression testing and verification (e.g., via the visual regression tool 116 or some other regression testing technique). The visual regression tool 116 can also receive configuration information for the regression testing, including, but not limited to, the particular type of device that is to be tested (e.g., mobile device, desktop, tablet, etc.), type of browser (e.g., Chrome®, Firefox®, Internet Explorer®, Safari®, iOS®, etc.), introductory starting point for the regression testing (e.g., a homepage of the application), etc. In one embodiment, the web page crawler 118 and image capture tool 120 can be implemented using Intern.io and/or Selenium Web-Driver (or another API used for web application testing) with programming languages such as Java, C#, Ruby, Python, Javascript, etc.

Once received, the visual regression tool 116 is configured to use the web page crawler 118 to locate and navigate to all web pages associated with the reference version of the application, and the image capture tool 120 to capture images of every web page hit by the web page crawler 118. In one embodiment, for the particular browser that is to be tested, the web page crawler 118 is configured to use the browser's native support capabilities for making direct calls to the browser. For example, the web page crawler can launch a browser (e.g., WebCrawler crawler=new Firefox-Driver( )) and log into the reference application by navigating to a first introductory page (e.g., homepage) of the reference application (e.g., crawler.get (application/homepage))).

Once logged in, the web page crawler 118 can locate all web pages associated with the reference application. That is, the web page crawler 118, starting from the homepage of the reference application, can locate all URL (links) on the homepage, navigate to each of web pages (e.g., using crawler.get or other function) and repeat the process of locating and navigating to other links on the navigated web pages until all web pages associated with the reference application are located and extracted. In one embodiment, to determine if a given web page navigated to by the crawler has any links, the web page crawler 118 parses HTML content for the web page for one or more attributes that have a URL as their value. Examples of such attributes include but are not limited to "href" attributes, "src" attributes, "action" attributes, "data" attributes, etc.

In one embodiment, for every web page of the reference application navigated to by the web page crawler 118, the visual regression tool 116 is configured to use the image capture tool 120 to capture and save an image of the respective web page (e.g., for Java using the command ((TakesScreenshot) driver).getScreenshotAs( )). In some examples, each image of a web page can be saved with an identifier that contains a portion (or all) of the URL associated with the particular web page. Using the homepage as a reference example, the image of the homepage for the reference application may have an identifier "homepage_reference" or some other identifier that indicates the image is of the homepage of the reference application.

Once the visual regression tool 116 captures and saves images for every web page of the reference application hit by the web page crawler 118, the visual regression tool 116 logs into the release candidate version of the application and performs a similar process to capture and save images of every web page of the release version of the application navigated to by the web page crawler 118. Each saved image for the release candidate version of the application can also be saved with an identifier that contains a portion (or all) of the URL associated with the particular web page. For the homepage as a reference example, the image of the homepage for the release application may have an identifier "homepage_release" or some other identifier.

Once images for the two versions of the application are captured, the visual regression tool 116 is configured to use the visual difference tool 122 to identify visual differences between the corresponding images from the two versions of the application. In one embodiment, the visual difference tool 122 can be implemented using an image analysis and comparison such as resemble.js. The visual difference tool 122 compares the images from the two versions of the application with corresponding identifiers (e.g., "homepage_release" with "homepage_production") and determines if there are any differences (or mismatch) between the two images. In one embodiment, the visual difference tool 122 can be configured with one or more parameters for comparing the two corresponding images. Examples of such parameters can include pixel threshold tolerance, one or more comparison methods (e.g., whether to ignore certain regions on a page or colors, antialiasing effects, etc.), the type of comparison metric (e.g., root-mean-square error (RMSE), peak signal to noise ratio (PSNR), etc.) and so on.

When comparing the images, the visual difference tool 122 analyzes the images pixel-by-pixel (e.g., according to the parameters). That is, the visual difference tool 122 compares the images to identify differences in pixel values for images from the reference version and pixel values for images from the release version. If the visual difference tool 122 determines differences (or mismatch) between the two images, the visual difference tool 122 generates an image that superimposes the two corresponding images and shows the differences between the two web page images. As noted, the visual difference tool 122 can generate a visualization of the differences in the generated image via highlighting in color, shading, grayscale, or any other method that makes the differences readily discernable (e.g., to a user), etc. In one embodiment, the visual difference tool 122 can apply a difference threshold to reduce the occurrence of false positives, effects of anti-aliasing, etc. In such a case, if the visual difference tool 122 determines that differences between a given pair of images are above a predefined threshold, the visual difference tool can generate another image highlighting the differences. Along with the generated image, the visual difference tool 122 can provide image comparison data, including the mismatch percentage, an indication of whether the dimensions between the two images are equal, differences in the dimensions (if any) and other information.

Additionally or alternatively, in some embodiments, the visual regression tool 116 can interact with a test harness or automated test framework when performing visual regression testing of an application. Using a tax preparation application as a reference example, the test harness can be configured to simulate a user interacting with the tax preparation application, such as searching for particular content items or features available from the interactive computing service 124 (e.g., searching for "tax return" in a search field on a homepage of the application), interacting with a workflow that aids the user in filling out a tax return, filling in particular data values in a form field for determining a tax credit for the user, and so on. The visual regression tool 116 can capture images of the output from the test harness interacting with the reference application and output from the test harness interacting with the release version of the application, and generate images that show the differences between the images.

In this manner, the visual regression tool 116 can generate images that show the differences between each corresponding pair of images for every web page from the two versions of the application. Once generated, a user (or quality engineer) can manually inspect the images to determine if the differences are acceptable. As such, embodiments herein substantially reduce (e.g., compared to traditional regression techniques) the amount of time associated with regressing multiple web pages of a target version of an application for different types of computing devices and web browsers, while at the same time improving the accuracy of the regression testing.

Figure 2:
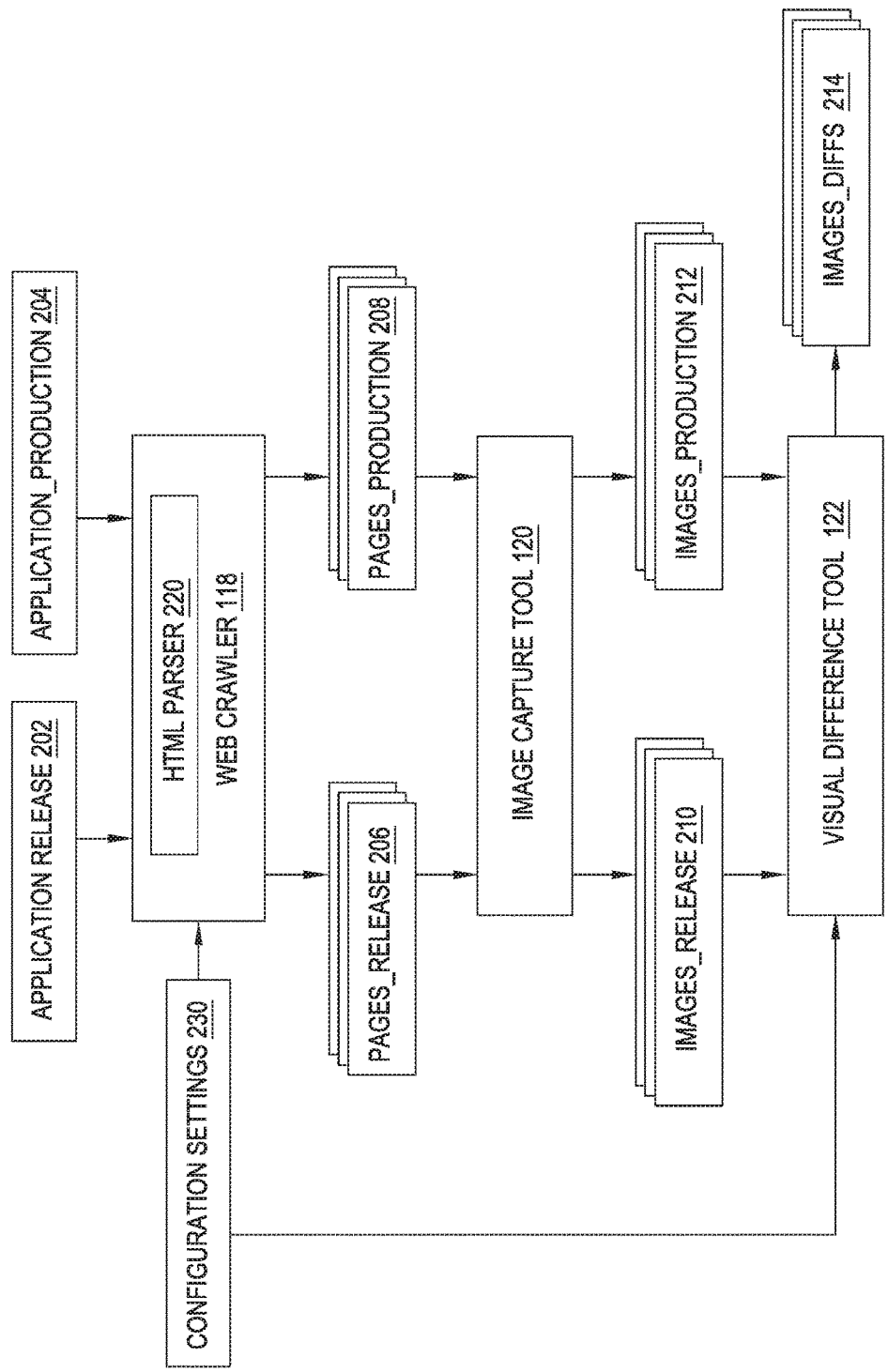
FIG. 2 illustrates components of the visual regression tool, according to one embodiment.

FIG. 2 further illustrates components of the visual regression tool 116 described relative to FIG. 1, according to one embodiment. As shown, the web page crawler 118 receives a release version 202 and a production version 204 of an application. The web page crawler 118 also receives configuration settings 230 specifying one or more parameters for the regression testing of the application. For example, as noted, such configuration settings 230 can specify the particular type of mobile device that is to be tested, operating system, web browser, homepage(s) of the application, pixel threshold values, visual difference metrics, etc.).

The web page crawler 118 (e.g., using intern.io and/or selenium webdriver) launches the particular browser specified in the configuration settings 230 and navigates to the homepage of the production version 204. The web page crawler 118 uses HTML parser 220 to parse the HTML content (of the homepage) for one or more HTML attributes with a URL as a value. Once links of the homepage are identified, the web page crawler 118 navigates to each of the links and repeats the process (e.g., using the HTML parser 220) to locate any URLs on the navigated web page. At the same time, for each web page that the web page crawler 118 navigates to, the visual regression tool 116 uses the image capture tool 120 to capture an image 212 of the web page. In this manner, the visual regression tool 116 can recursively locate and capture images of all web pages associated with the production version 204 of the application (e.g., by traversing web links from the initial web page of the production version 204). The set of images for the production version 204 the application can then be used as a "gold" standard for how the various UI elements for each web page should be displayed (e.g., for the release version 202 of the application).

Once images are captured for the production version 204, the visual regression tool 116 performs a similar process for the release version 202 of the application. That is, the visual regression tool 116 (via the web page crawler 118 and image capture tool 120) captures and saves an image 210 for each web page 206 associated with the release version 202 of the application. In one embodiment, the visual regression tool 116 identifies the corresponding web pages (e.g., in the release version 202) by matching URLs for the web pages in the different versions. That is, for one or more of the web pages in the production version 204, the visual regression tool 116 may match a URL for a web page in the release version 202 to a URL for the web page in the production version 204.

Once images are captured for both versions of the application, the visual regression tool 116 uses the visual difference tool 122 to compare and analyze each corresponding pair of images pixel-by-pixel to determine if there are mismatches between the images. If there are, the visual difference tool 122 generates an image 214 for each pair of images that shows the differences. As noted above, in some examples, the visual difference tool 122 can apply a pixel difference threshold (e.g., specified in the configuration settings 230) or region of interest for identifying differences for determining whether to generate an image that highlights the differences between any two web page images. Doing so may prevent the occurrence of false positives, effects due to anti-aliasing, noise that may be present in the images, etc.

Figure 3A:
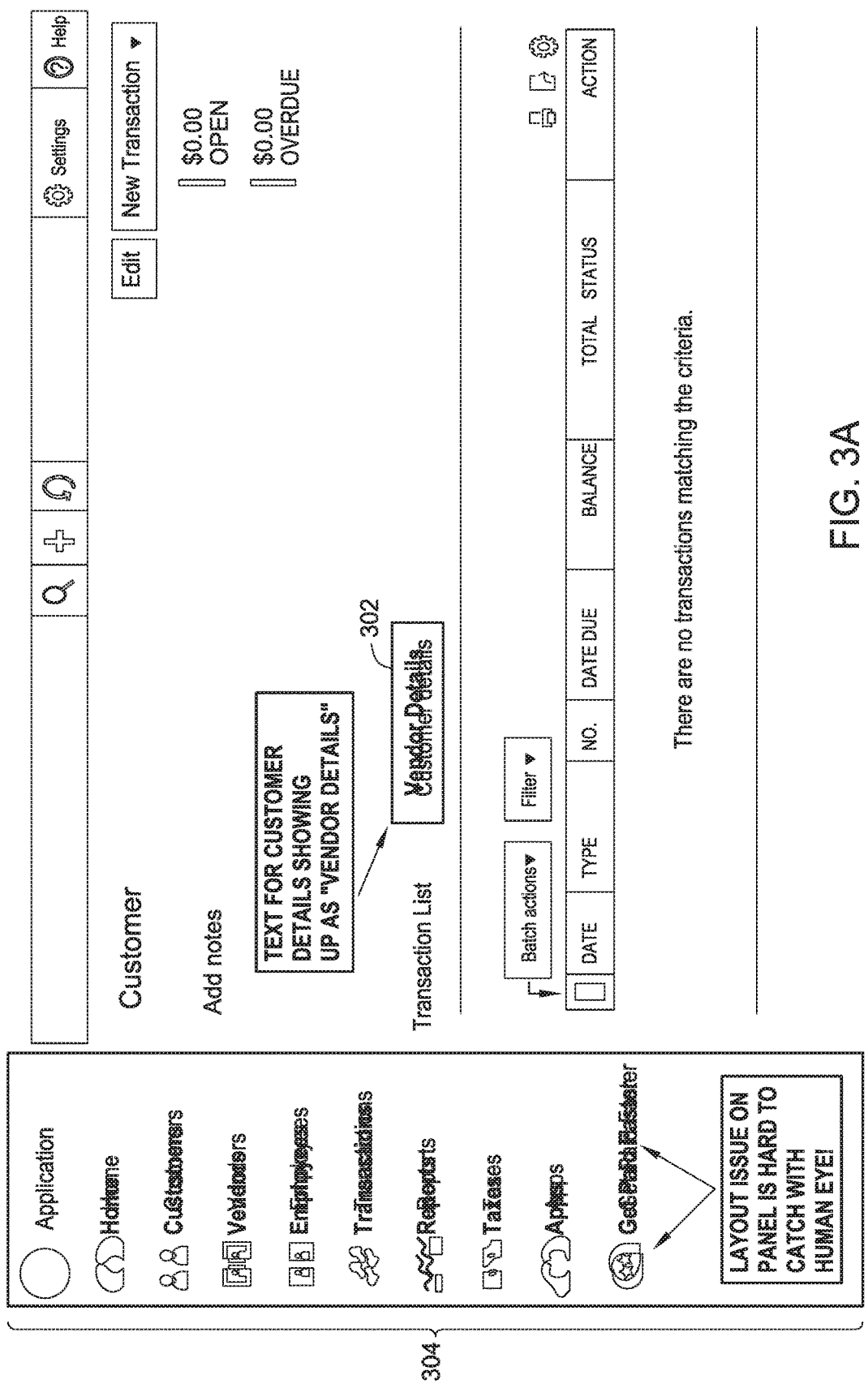

FIGS. 3A-3C illustrate different examples of generated images highlighting differences between two different versions of a web page for an online accounting software application.

FIG. 3A, in particular, shows an example web page of the application that can be used to track customer information, according to one embodiment. In this example, the visual difference tool 122 determines a mismatch at 302 of the webpage between the production and release version of the application (e.g., what should be displayed as "Customer Details" in the release version is instead showing up as "Vendor Details" in the release version). Further, the visual difference tool 122 is also able to identify a mismatch in the layout of the elements in panel 304. Such differences (e.g., at 302 and 304) are examples of the type of visual defects that would likely be missed with conventional regression techniques, which generally rely on a user catching each minute visual defect that may be present solely with the human eye. Using the techniques presented herein, however, once the differences at 302 and 304 are determined, the visual difference tool 122 highlights the differences in order to make such mismatches easily discernable to a user.

FIG. 3B shows another example web page of an online accounting software application that can be used to generate an invoice for a customer, according to one embodiment. In this example, the visual difference tool 122 identifies and highlights a mismatch 306 for this particular web page between the production version and release version of the application (e.g., "Payment Status" is being displayed on the release version of the application instead of "Balance Due" on the production version of the application). FIG. 3C shows yet another example web page of an online accounting software application that can be used to generate sales transactions, according to one embodiment. As shown, in this example, the visual difference tool 122 identifies that an "Import Transactions" feature 308 is missing from the release version of the application, and highlights the difference.

Note that the example images in FIG. 3A-3C are included merely as reference examples of the types of differences between two different versions of a web page that can be brought to a user's attention, without requiring the user to write tests or and/or extend a substantial amount of human effort. More generally, however, those of ordinary skill in the art will recognize that the techniques presented herein can be applied to other types of software applications provided to a user via web pages hosted on an application server. Further, the techniques presented herein can be applied to web pages with static content as well as web pages with dynamically generated content.

Figure 4:
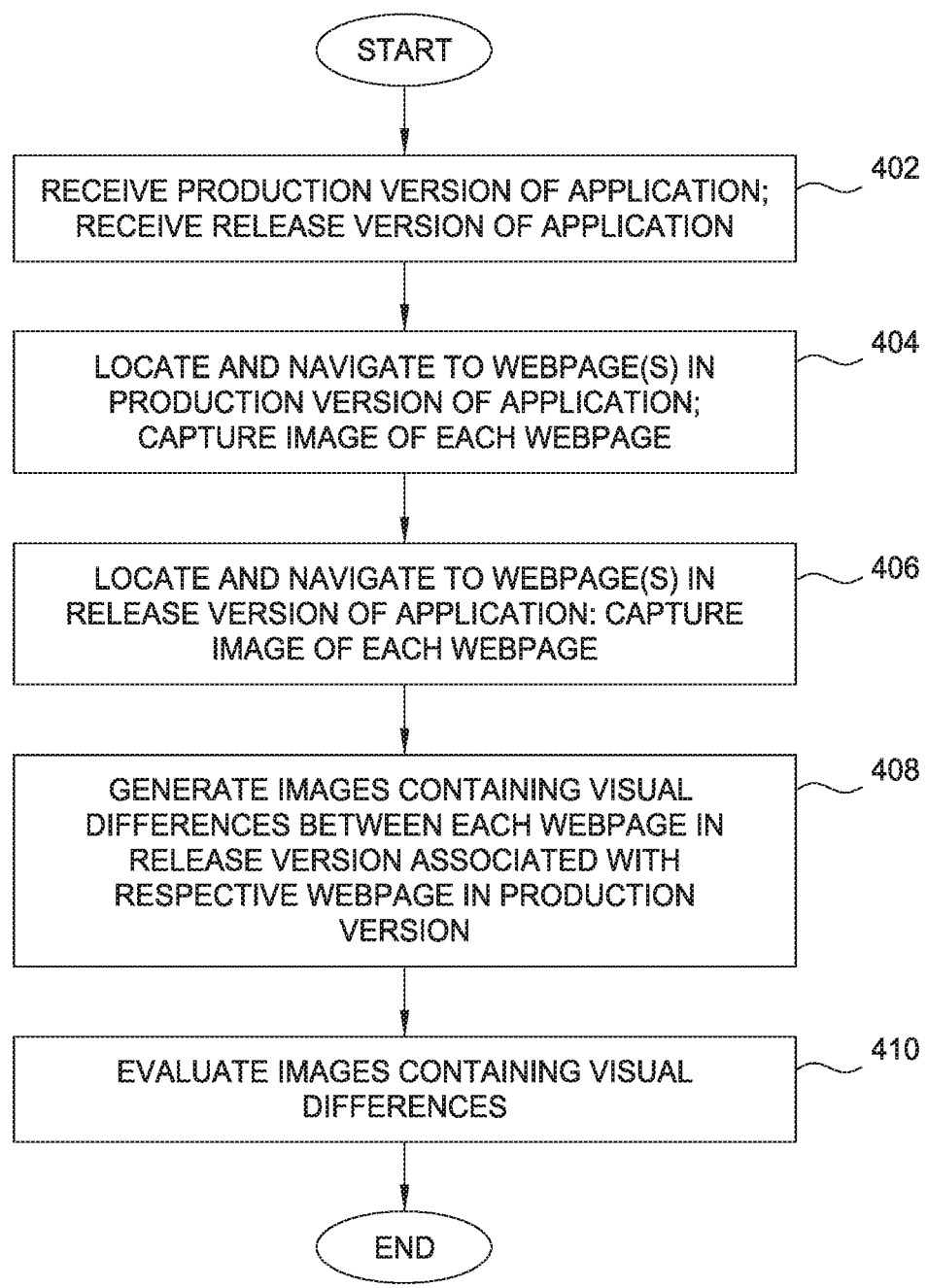
FIG. 4 illustrates a method for performing visual regression testing for an application, according to one embodiment.

FIG. 4 illustrates a method 400 for performing visual regression testing for an application, according to one embodiment. As shown, the method 400 begins at step 402, where the visual regression tool 116 receives a production (e.g., source) version of an application (e.g., an online tax-preparation service, online accounting application/service, etc.) and a candidate release (e.g., target) version of the application. At 404, the visual regression tool 116 locates and navigates to each web page associated with the production version of the application. That is, the visual regression tool 116 identifies a first collection of web pages associated with the production version by traversing web links from an initial web page of the production version.

For example, as noted above, to locate each web page associated with the application, the visual regression tool 116 can start at a homepage of the application, parse HTML content for all URLs for the homepage, and navigate to each identified URL. The visual regression tool 116 then captures an image of each web page that is identified by traversing the web links from the initial web page of the production version. The visual regression tool 116 then repeats the process for each navigated URL until images are captured for each web page associated with the production version of the application.

At 406, the visual regression tool 116 locates and navigates to each web page associated with the release version of the application, and captures an image of the respective web page. As noted, in one embodiment, the visual regression tool 116 identifies, for one or more web pages in the production version, a corresponding web page in a release version of the application. At 408, the visual regression tool 116 compares corresponding images from the two versions of the application (e.g., using one or more difference metrics). In one embodiment, the visual regression tool 116 identifies differences in pixel values for images in the production version and pixel values for images in the release version to determine one or more differences between an image of at least one web page in the production version and the corresponding image of the web page in the release version. Once identified, the visual regression tool 116 generates an image (for every respective pair of web page images) that shows the visual differences between the respective versions.

In some embodiments, the visual regression tool 116 can apply a threshold for determining whether to generate an image that highlights the differences between the two versions. Put differently, if the visual regression tool 116 determines that the amount of differences (or mismatch) in pixel values between two respective images are above a predefined threshold value (or percentage), the visual regression tool 116 can generate an image that points out the differences. At 410, each image is evaluated (e.g., by a user) for unexpected visual defects that may be present in the release version of the application.

The visual regression tool can also be configured to ignore certain regions of a page when it compares the reference and target pages. In one embodiment, the region to ignore can be specified with the pixel coordinates of the upper left corner of the rectangle region to ignore followed by the pixel width and pixel height of the rectangle (e.g. "0 750 300 700")

Advantageously, the visual regression tool 116 allows a user to quickly identify visual defects that may be present in web pages of a release version of an application, without writing regression tests to test for pre-defined expected visual elements and without requiring substantial human effort to identify minute visual differences.

Figure 5:
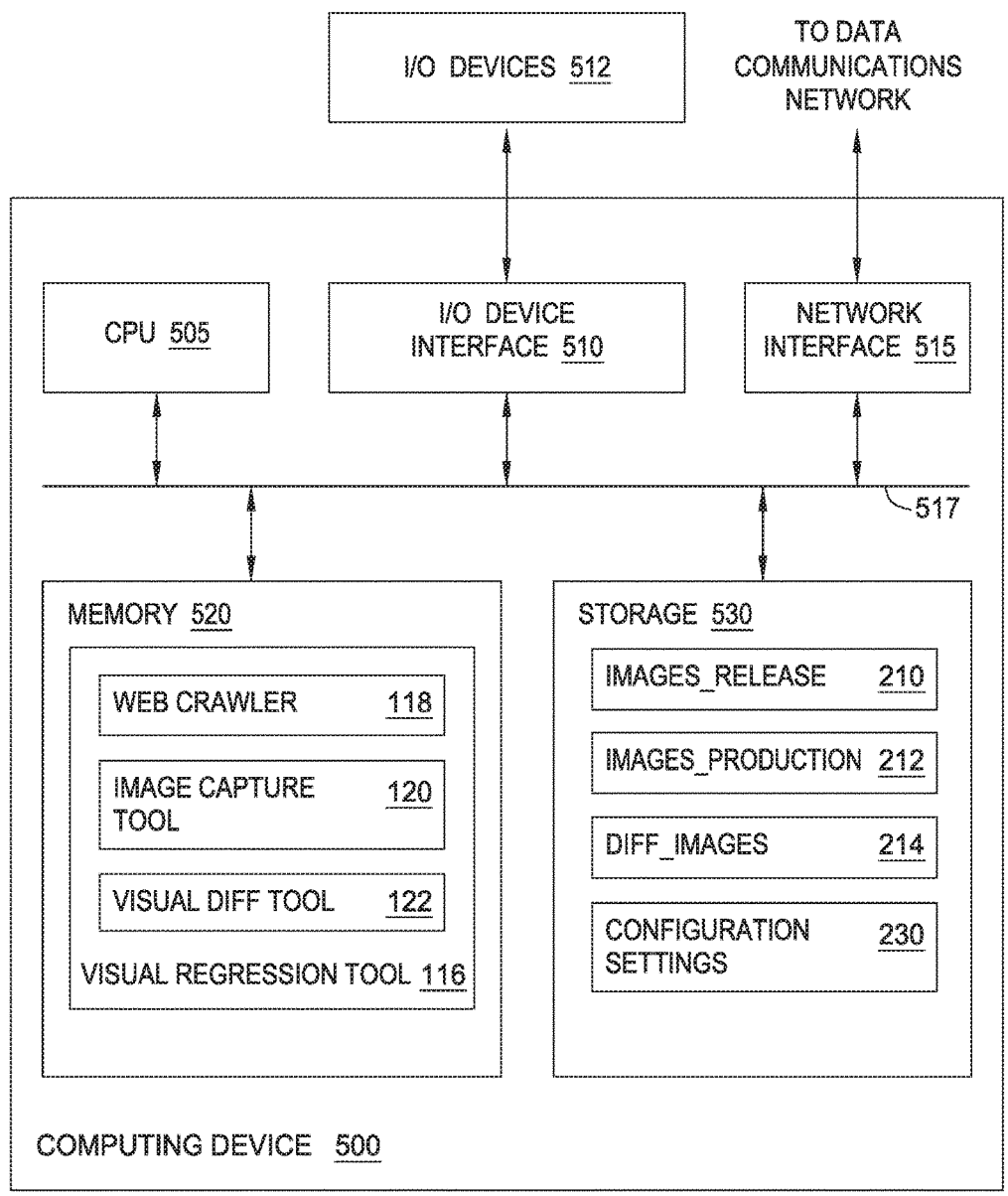
FIG. 5 illustrates an example computing system for implementing regression testing for an application, according to one embodiment.

FIG. 5 illustrates an example computing system 500 used to perform visual regression testing for an application, according to one embodiment. As shown, the computing system 500 includes, without limitation, a central processing unit (CPU) 505, a network interface 515, a memory 520, and storage 530, each connected to a bus 517. The computing system 500 may also include an I/O device interface 510 connecting I/O devices 512 (e.g., keyboard, display and mouse devices) to the computing system 500. Further, the computing elements shown in computing system 500 may correspond to a physical computing system (e.g., a system in a data center) or may be a visual computing instance executing within a computing cloud.

The CPU 505 retrieves and executes programming instructions stored in the memory 520 as well as stored in the storage 530. The bus 517 is used to transmit programming instructions and application data between the CPU 505, I/O device interface 510, storage 530, network interface 515, and memory 520. Note, CPU 505 is included to be representative of a single CPU, multiple CPUs, a single CPU having multiple processing cores, and the like, and the memory 520 is generally included to be representative of a random access memory. The storage 530 may be a disk drive or flash storage device. Although shown as a single unit, the storage 530 may be a combination of fixed and/or removable storage devices, such as fixed disc drives, removable memory cards, optical storage, network attached storage (NAS), or a storage area-network (SAN).

Illustratively, the memory 520 includes a visual regression tool 116, which includes a web page crawler 118, image capture tool 120, and visual difference tool 122, all of which are discussed in greater detail above. Further, storage 530 includes images 210 and 212 captured from the release and production versions of an application, respectively, difference images 214, and configuration settings 230, all of which are also discussed in greater detail above.

Advantageously, the techniques presented herein substantially reduce the amount of manual effort developers have to invest when testing for visual defects that may be present in an upcoming release of an application. For example, embodiments herein can be applied across multiple different types of devices, browsers, and can cover all web pages associated with the application.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, any aspects, features, embodiments and advantages are included to be illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for performing visual regression testing of an application, comprising:
identifying a first collection of web pages associated with a first version of the application by traversing web links from an initial web page of the first collection;
capturing an image of each web page identified by traversing the web links from the initial web page of the first collection;
identifying, for one or more of the web pages in the first collection, a corresponding web page in a second collection of web pages associated with a second version of the application;
capturing an image of the corresponding web pages in the second collection;
identifying differences in pixel values for images in the first collection and pixel values for images in the second collection to determine one or more differences between the image of at least one web page in the first collection and the image of the corresponding web page in the second collection; and
upon determining that an amount of differences in pixel values for the image of the at least one web page in the first collection and the image of the corresponding web page in the second collection exceeds a defined threshold value, generating an image providing a visualization of the one or more differences.

2. The computer-implemented method of claim 1, wherein the image of the at least one web page in the first collection includes content generated from output of a test harness interacting with the first version of the application and wherein the image of the corresponding web page in the second collection includes content generated from output of the test harness interacting with the second version of the application.

3. The computer-implemented method of claim 1, wherein generating the image comprises superimposing the image of the corresponding web page in the second collection on the image of the web page in the first collection.

4. The computer-implemented method of claim 3, wherein the visualization of the one or more differences displays the one or more differences in color, shading or grayscale.

5. The computer-implemented method of claim 1, wherein the second collection of web pages associated with the second version of the application are identified by traversing web links from an initial web page of the second collection.

6. The computer-implemented method of claim 5, wherein the web links from the first collection and second collection are identified by parsing hypertext markup language (HTML) content of one or more web pages in the first collection and second collection for one or more attributes that have a uniform resource locator (URL) as a value.

7. The computer-implemented method of claim 1, wherein each corresponding web page in the second collection is identified by matching a uniform resource locator (URL) for the web page in the second collection to a URL for one of the web pages in the first collection.

8. The computer-implemented method of claim 1, wherein the first version of the application is a version of an online interactive accounting service exposed to users over a data communications network, and wherein the second version of the application is a version of the online interactive accounting service exposed that has not been exposed to users.

9. The computer-implemented method of claim 1, wherein identifying the differences in pixel values for images in the first collection and pixel values for images in the second collection comprises refraining from identifying differences in pixel values for a predetermined region of each image in the first collection and pixel values for the predetermined region of each image in the second collection.

10. A non-transitory computer-readable storage medium storing instructions, which when executed on a processor, perform an operation for visual regression testing of an application, the operation comprising:
identifying a first collection of web pages associated with a first version of the application by traversing web links from an initial web page of the first collection;
capturing an image of each web page identified by traversing the web links from the initial web page of the first collection;
identifying, for one or more of the web pages in the first collection, a corresponding web page in a second collection of web pages associated with a second version of the application;
capturing an image of the corresponding web pages in the second collection;
identifying differences in pixel values for images in the first collection and pixel values for images in the second collection to determine one or more differences between the image of at least one web page in the first collection and the image of the corresponding web page in the second collection; and
upon determining that an amount of differences in pixel values for the image of the at least one web page in the first collection and the image of the corresponding web page in the second collection exceeds a defined threshold value, generating an image providing a visualization of the one or more differences.

11. The non-transitory computer-readable storage medium of claim 10, wherein the image of the at least one web page in the first collection includes content generated from output of a test harness interacting with the first version of the application and wherein the image of the corresponding web page in the second collection includes content generated from output of the test harness interacting with the second version of the application.

12. The non-transitory computer-readable storage medium of claim 10, wherein the visualization of the one or more differences displays the one or more differences in color, shading or grayscale.

13. The non-transitory computer-readable storage medium of claim 10, wherein the second collection of web pages associated with the second version of the application are identified by traversing web links from an initial web page of the second collection, and wherein the web links from the first collection and second collection are identified by parsing hypertext markup language (HTML) content of one or more web pages in the first collection and second collection for one or more attributes that have a uniform resource locator (URL) as a value.

14. The non-transitory computer-readable storage medium of claim 10, wherein each corresponding web page in the second collection is identified by matching a uniform resource locator (URL) for the web page in the second collection to a URL for one of the web pages in the first collection.

15. The non-transitory computer-readable storage medium of claim 10, wherein identifying the differences in pixel values for images in the first collection and pixel values for images in the second collection comprises refraining from identifying differences in pixel values for a predetermined region of each image in the first collection and pixel values for the predetermined region of each image in the second collection.

16. A system, comprising:
a processor; and
a memory containing a program which, when executed on the processor, performs an operation for visual regression testing of an application, the operation comprising:
identifying a first collection of web pages associated with a first version of the application by traversing web links from an initial web page of the first collection;
capturing an image of each web page identified by traversing the web links from the initial web page of the first collection;
identifying, for one or more of the web pages in the first collection, a corresponding web page in a second collection of web pages associated with a second version of the application;
capturing an image of the corresponding web pages in the second collection;
identifying differences in pixel values for images in the first collection and pixel values for images in the second collection to determine one or more differences between the image of at least one web page in the first collection and the image of the corresponding web page in the second collection; and upon determining that an amount of differences in pixel values for the image of the at least one web page in the first collection and the image of the corresponding web page in the second collection exceeds a defined threshold value, generating an image providing a visualization of the one or more differences.

17. The system of claim 16, wherein the image of the at least one web page in the first collection includes content generated from output of a test harness interacting with the first version of the application and wherein the image of the corresponding web page in the second collection includes content generated from output of the test harness interacting with the second version of the application.

18. The system of claim 16, wherein the second collection of web pages associated with the second version of the application are identified by traversing web links from an initial web page of the second collection, and wherein the web links from the first collection and second collection are identified by parsing hypertext markup language (HTML) content of one or more web pages in the first collection and second collection for one or more attributes that have a uniform resource locator (URL) as a value.

19. The system of claim 16, wherein each corresponding web page in the second collection is identified by matching a uniform resource locator (URL) for the web page in the second collection to a URL for one of the web pages in the first collection.

20. The system of claim 16, wherein identifying the differences in pixel values for images in the first collection and pixel values for images in the second collection comprises refraining from identifying differences in pixel values for a predetermined region of each image in the first collection and pixel values for the predetermined region of each image in the second collection.

* * * * *

UNITED STATES PATENT AND TRADEMARK OFFICE
CERTIFICATE OF CORRECTION

PATENT NO. : 10,146,753 B2  
APPLICATION NO. : 15/218861  
DATED : December 4, 2018  
INVENTOR(S) : Carol Chiam-Mei Tsai, Nirja Shah and Muzaffar H. Malik It is certified that error appears in the above-identified patent and that said Letters Patent is hereby corrected as shown below:

On the Title Page

In the Inventors names:
Item (72), Inventors: replace First named inventor "Carol Chiam-Mei Tsai" with --Carol Chia-Mei Tsai--.

Signed and Sealed this
Seventh Day of February, 2023

Katherine Kelly Vidal
*Director of the United States Patent and Trademark Office*